United States Patent

[11] 3,590,979

| [72] | Inventor | Fritz J. Lupo<br>Bloomfield Hills, Mich. |
|---|---|---|
| [21] | Appl. No. | 755,121 |
| [22] | Filed | Aug. 26, 1968 |
| [45] | Patented | July 6, 1971 |
| [73] | Assignee | Feedmatic-Detroit, Inc.<br>Southfield, Mich. |

[54] MECHANICAL PART FEEDER
3 Claims, 5 Drawing Figs.

[52] U.S. Cl. .................................................. 198/53,
198/154
[51] Int. Cl. ................................................. B65g 47/18
[50] Field of Search .......................................... 198/33, 33
R, 54, 55, 156; 221/159, 160

[56]     References Cited
UNITED STATES PATENTS

| 1,459,246 | 6/1923 | Parker | 198/156 |
| 1,356,390 | 10/1920 | Myers | 198/55 |
| 1,501,622 | 7/1924 | Ruau | 198/55 X |
| 3,070,210 | 12/1962 | Woodward | 198/33.1 |

*Primary Examiner*—Evon C. Blunk
*Assistant Examiner*—Alfred N. Goodman
*Attorney*—Whittemore, Hulbert & Belknap

ABSTRACT: A feeder for distributing small parts such as nuts, to a multiplicity of separate feed tracks. The articles are elevated along the underside of an inclined mechanical conveyor or belt on which they are distributed substantially uniformly across the width thereof, and are permitted to drop from the belt onto the feed tracks.

3,590,979

MECHANICAL PART FEEDER

CROSS-REFERENCE TO RELATED APPLICATION

The present application relates to a part feeder for small parts of the type generally disclosed in Brining et al. application, Ser. No. 746,567, filed July 22, 1968 now abandoned, and assigned to the assignee of the present application. While the earlier application employs magnets to carry the parts at the underside of an inclined conveyor belt, mechanical means are disclosed herein.

BRIEF SUMMARY OF THE INVENTION

A supply of the small parts, such for example as nuts, is received in a hopper through which a relatively wide continuous article conveying member moves upwardly. The parts are to be fed along a plurality of feed tracks. At least a portion of the upwardly moving conveyor is inclined so as to extend over the entrance end of the tracks. Means are provided for carrying articles at the underside of the conveyor and for separating the articles at this point from the conveyor to distribute them uniformly on the tracks.

The tracks are so shaped with reference to the particular shape of the articles that only such articles as are properly oriented remain on the tracks and advance along the tracks to a multiplicity of operating stations. Preferably, movement of the articles along the tracks, at least at this point in the system, is by gravity due to a suitable inclination of the tracks.

It has previously been suggested that the means for carrying the articles upwardly at the underside of the inclined conveyor may be magnetic.

While the magnetic system is very efficient with magnetic articles, there are cases in which the articles to be loaded onto the multiplicity of tracks are formed of a nonmagnetic material and hence, cannot be used in a magnetic system. In this case the present invention contemplates that the conveyor is provided with a multiplicity of shallow troughs extending transversely of the conveyor. Means are provided to cause these troughs to change their inclination to empty the articles contained therein onto the tracks. This may be accomplished by a suitable change in the angle of inclination of the conveyor at a point above the entrance ends of the tracks.

DETAILED DESCRIPTION OF THE INVENTION

Figure 1:
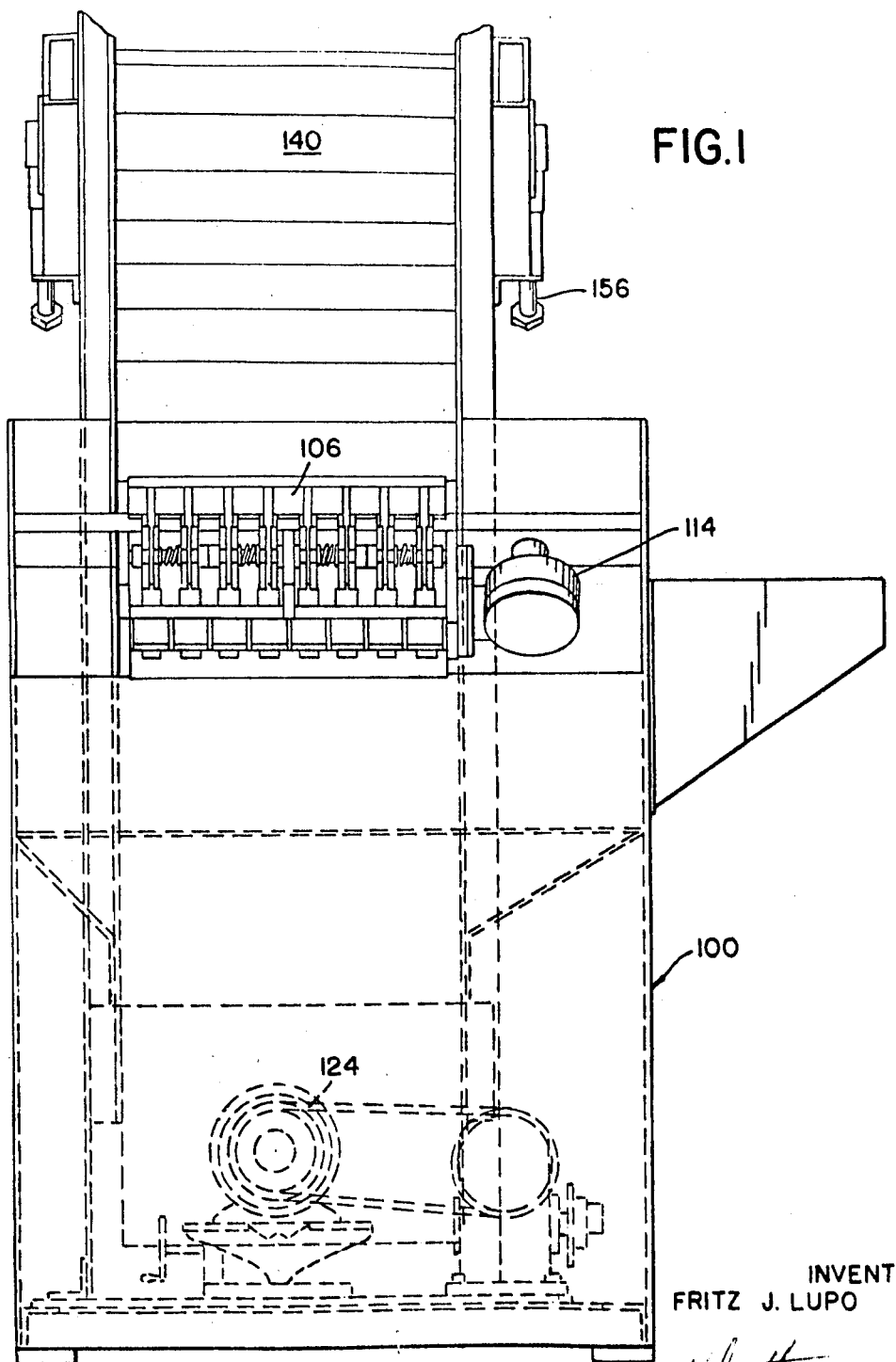
FIG. 1 is a front elevational view of a mechanical feeder.

The feeder comprises a main frame indicated generally at 100 having at its upper end a plurality of orienting tracks 102 each of which is connected to the upper end of a substantially closed feed conduit 104. The upper ends of the orienting tracks 102 are connected by a transversely inclined plate 106 onto which nuts or similar articles are adapted to be dropped by the elevating conveyor as will presently be described. In this case, means are also provided for brushing off nuts which are improperly oriented from the tracks 102 and this means comprises clearing wheels 108 each associated with one of the tracks 102 and driven by belts 110 from drive means 112 driven by a motor 114.

Figure 2:
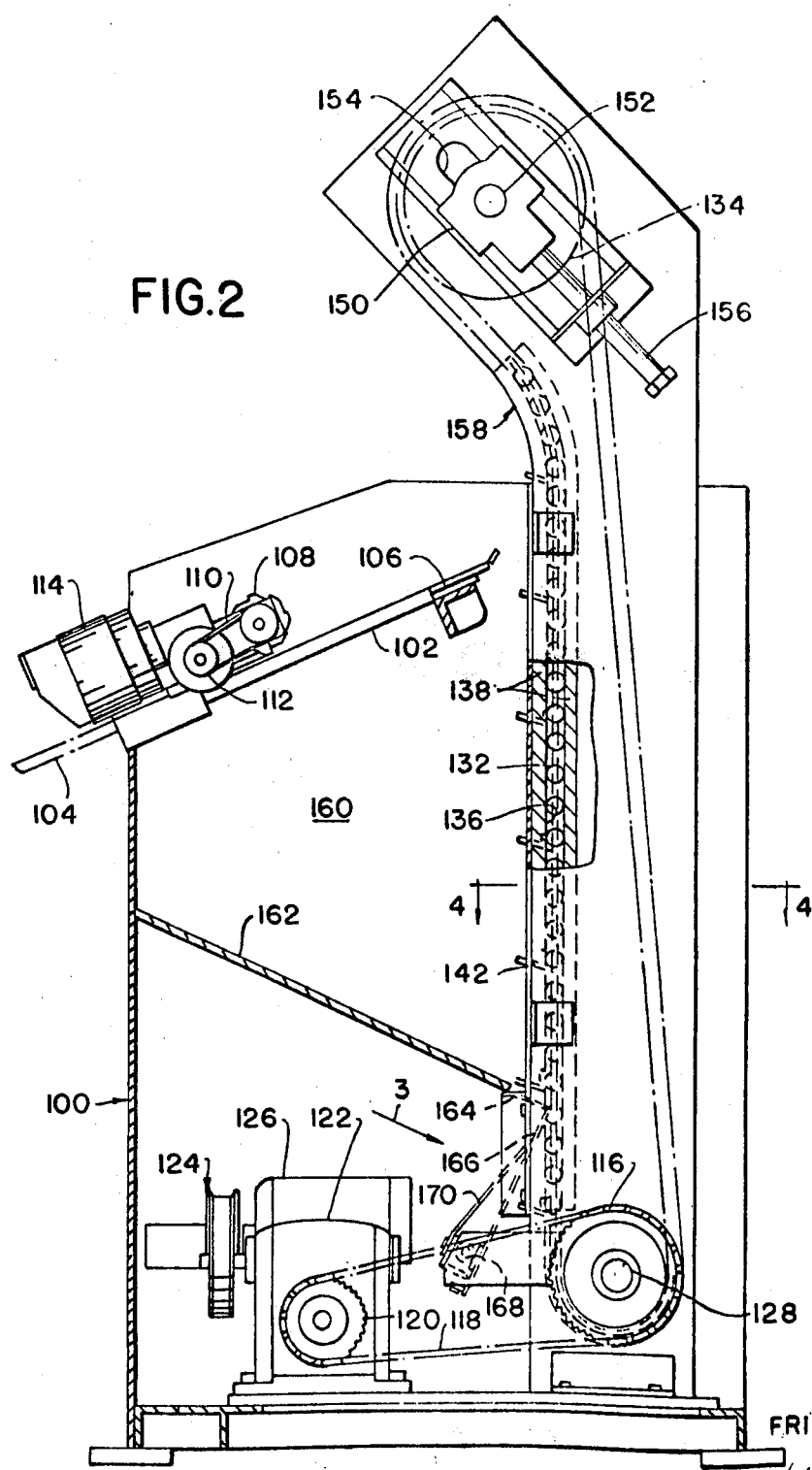
FIG. 2 is a side elevational view of the mechanical feeder with parts broken away.
Figure 3:
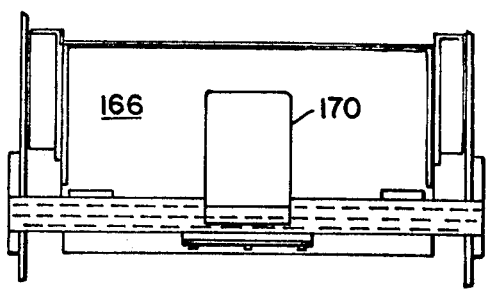
FIG. 3 is a fragmentary view looking in the direction of the arrow 3 in FIG. 2.
Figure 4:
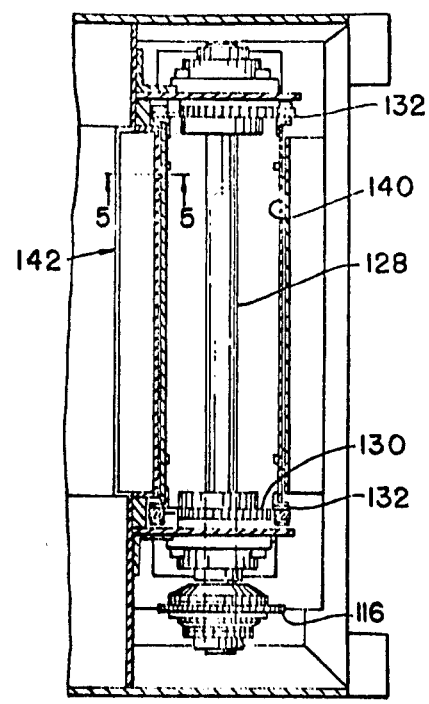
FIG. 4 is a sectional view on the line 4—4, FIG. 2.

The means for elevating the articles and for discharging them onto the distribution plate 106 comprises a drive sprocket 116 driven through a chain 118 from a sprocket 120 carried by a speed reducer 122 driven through a belt and pulley combination 124 from a motor 126. As best seen in FIG. 4, the sprocket 116 drives a shaft 128 carrying sprockets 130 driving chains 132. At the upper end of the feeder the chain 132 engages around a sprocket diagrammatically indicated at 134. Intermediate the sprockets 132 and 134 the upwardly moving portion of the chain moves in a channel 136 provided between guide plates 138, and as best seen in FIG. 2, the channel 136 inclines forwardly from the vertical to provide a portion thereof directly above the inclined distribution plate 106.

Referring again to FIGS. 4 and 5 it will be observed that strips 140 extend transversely between the chains at opposite ends of the shaft 128. Connected to the strips 140 are a multiplicity of shallow troughs or shelves 142 each of which comprises an upwardly and forwardly inclined floor portion 144 and an attaching flange 146 by means of which the troughs are attached to the transverse strips 140. Thus, the strips 140 and the floor members 144 constitute elongated transversely extending receptacles adapted to receive a limited number of nuts or similar elements to be moved upwardly as the sprockets are rotated clockwise, as seen in FIG. 2. The upper sprocket 134 may be adjusted by means of brackets 150 carrying the shaft 152 to which the sprockets 134 are connected, the brackets being adjustable longitudinally of slots 154 by belt tightening screws 156. The inclination of the troughs 142 and the location of the forwardly inclined portion 158 of the track 136 is such that as the transversely extending trough members reach the position directly above the distribution plate 106 they are changed from a forward and upward inclination to a downward inclination so that the nuts or other articles received thereon slide out of the troughs and are discharged to the plate 106.

Figure 5:
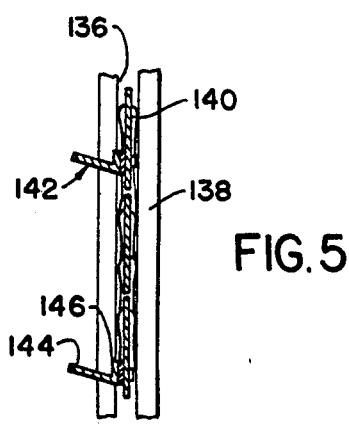
FIG. 5 is a fragmentary sectional view on the line 5—5, FIG. 4.

The feeder comprises a hopper 160 having a downwardly inclined floor 162 which delivers the nuts to the position to be picked up by the trough members 142. As best seen in FIG. 5 it will be observed that the plates 140 together constitute a continuous wall which prevents escape of nuts from the receptacle or hopper except as they are carried upwardly by the troughs 142.

In order to permit the troughs to enter into the receptacle there is provided a closure plate 164 which is formed as the flange on a plate 166 which in turn is pivoted to a shaft 168. A spring 170 is provided which bears against the plate 166 and urges it to the position shown in FIG. 2. As each of the troughs 142 moves upwardly, its forward or outer edge engages the plate 166 and causes the plate to swing counterclockwise until the trough member reaches a position above the arcuate flange 164. At this instant the trough member constitutes a bottom wall for the hopper and as it moves slightly upwardly, the spring 170 swings the plate 166 and the arcuate closure 164 to closing position.

The drawings and the foregoing specification constitute a description of the improved mechanical part feeder in such full, clear, concise and exact terms as to enable any person skilled in the art to practice the invention, the scope of which is indicated by the appended claims.

What I claim as my invention is:

1. Apparatus for depositing a multiplicity of small parts with substantially uniform distribution on a surface, said apparatus comprising a flexible conveyor having a portion movable upwardly in contact with a supply of parts throughout a substantial portion of its width, the upwardly moving conveyor portion having a portion inclined from the vertical to be directly above the surface, means for causing a multiplicity of parts to move upwardly with said conveyor at the underside thereof with substantially uniform distribution across said conveyor to the position directly above the surface and for there causing said parts to separate from said conveyor and to fall by gravity onto the surface, the means for causing parts to move upwardly with the conveyor and to separate therefrom comprising a plurality of elongated troughs extending transversely of the conveyor, and means for changing the direction of movement of the upwardly moving portion of the conveyor so as to cause said troughs to spill parts contained therein as the conveyor traverses the space directly above the surface to which the parts are to be distributed, said conveyor comprising laterally spaced chains, strips extending between the chains and having edge portions directly adjacent each other, said troughs being individually secured to said strips to extend substantially the full length thereof, a hopper containing parts, said hopper having an opening in its bottom wall through which said conveyor and troughs move, a movable closure plate adapted to close said opening and movable to permit passage of the individual troughs therethrough, and cam means operable as each trough approaches the opening to move the movable closure plate out of the way to provide for movement of the individual troughs into the hopper.

2. A part feeder comprising an elongated distributor plate, a multiplicity of elongated open tracks having separated portions in position to receive parts moving across one edge of said plate, a hopper below said plate in position to receive parts which do not enter said tracks and fall between the separated track portions, a flexible conveyor movable upwardly through said hopper in contact with parts therein, said hopper and conveyor having a width measured transversely of said tracks at least equal to the separation between the tracks adjacent opposite ends of said plate, said conveyor having an upwardly moving portion inclined over said plate, means for causing parts from said hopper to advance upwardly with said conveyor at the underside thereof in substantially uniform distribution thereacross and for releasing said parts from said conveyor directly above said plate to fall downwardly thereon by gravity, said conveyor comprising a multiplicity of strips having adjacent edge portions and adapted to constitute a substantially continuous surface, some of said strips having elongated trough forming elements secured thereto, and means for changing the direction of movement of the conveyor in a zone directly above said distributor plate to cause said troughs to spill the articles contained therein onto said plate, said hopper having an elongated opening in its bottom wall through which said conveyor and said trough forming elements pass, movable closure means for said opening, and cam means operable to move said closure means to clearance position upon approach of each of said trough forming elements.

3. A part feeder as defined in claim 2 in which said closure means is pivoted and comprises a camming strip extending the full width of said conveyor which is directly engaged by the outer edge of each trough forming element so as to cam the closure means out of the way to permit the trough forming element to enter the hopper while preventing spillage of parts from said hopper.